(12) United States Patent
Lai

(10) Patent No.: US 8,249,675 B2
(45) Date of Patent: Aug. 21, 2012

(54) SLIDE TYPE ELECTRONIC DEVICE

(75) Inventor: Jin-Shi Lai, Shenzhen (CN)

(73) Assignees: Hong Fu Jin Precision Industry (ShenZhen) Co., Ltd., Shenzhen City, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 290 days.

(21) Appl. No.: 12/696,011

(22) Filed: Jan. 28, 2010

(65) Prior Publication Data

US 2010/0323771 A1 Dec. 23, 2010

(30) Foreign Application Priority Data

Jun. 23, 2009 (TW) ................................ 98120911 A

(51) Int. Cl.
*H04W 74/00* (2009.01)
(52) U.S. Cl. ............... 455/575.4; 455/575.1; 455/575.2; 455/575.3; 455/550.1; 16/284; 16/327; D14/138
(58) Field of Classification Search ............... 455/550.1, 455/575.1–575.4; D14/138; 16/327, 284
See application file for complete search history.

(56) References Cited

U.S. PATENT DOCUMENTS

| | | | |
|---|---|---|---|
| 7,583,989 B2 * | 9/2009 | Lee et al. ................... | 455/575.4 |
| 7,653,422 B2 * | 1/2010 | Roberts ....................... | 455/575.4 |
| 7,697,280 B2 * | 4/2010 | Wang ......................... | 361/679.55 |
| 2006/0030381 A1 * | 2/2006 | Byun et al. ................. | 455/575.4 |
| 2006/0058078 A1 * | 3/2006 | Shiogama ................... | 455/575.1 |
| 2006/0079301 A1 * | 4/2006 | Kim et al. ................... | 455/575.3 |
| 2007/0155451 A1 * | 7/2007 | Lee ............................. | 455/575.4 |
| 2008/0052874 A1 * | 3/2008 | Liu .............................. | 16/246 |
| 2008/0200222 A1 * | 8/2008 | Jang et al. .................. | 455/575.4 |
| 2008/0207284 A1 * | 8/2008 | Jung et al. .................. | 455/575.4 |
| 2009/0011805 A1 * | 1/2009 | Eaton ......................... | 455/575.4 |
| 2009/0029749 A1 * | 1/2009 | Lee ............................. | 455/575.4 |
| 2009/0151119 A1 * | 6/2009 | Shen ........................... | 16/308 |
| 2009/0183340 A1 * | 7/2009 | Chiang ....................... | 16/327 |
| 2010/0016043 A1 * | 1/2010 | Kajita et al. ............... | 455/575.4 |
| 2010/0151924 A1 * | 6/2010 | Amano ....................... | 455/575.4 |

* cited by examiner

*Primary Examiner* — Jinsong Hu
*Assistant Examiner* — Qun Shen
(74) *Attorney, Agent, or Firm* — Altis Law Group, Inc.

(57) ABSTRACT

A slide type electronic device is provided. The electronic device includes a base; a sliding member slidably connected to the base; a release assisting mechanism includes an angled groove and a resilient member, the angled groove includes a first groove and a second groove, the first groove and the second groove extend to form an angle and meet at an intersection, the resilient member includes a protrusion received in the angled groove; when the sliding member slides relative to the base, the resilient member moves with the sliding member and the protrusion is guided to move along the angled groove, which causes the resilient member to bend elastically; after the protrusion passes the intersection, the protrusion engages one of the first groove and the second groove, which facilitates the sliding of the sliding member via the restoration of the resilient member.

19 Claims, 6 Drawing Sheets

SLIDE TYPE ELECTRONIC DEVICE

BACKGROUND

1. Technical Field

The disclosure relates to electronic devices and, particularly, to a slide type electronic device.

2. Description of Related Art

Nowadays, electronic devices, such as slide type cell phones, are very popular. However, when a user opens or closes the cell phones, the user has to push or pull the sliding member through the entire process, it is very inconvenient.

BRIEF DESCRIPTION OF THE DRAWINGS

The components of the drawings are not necessarily drawn to scale, the emphasis instead being placed upon clearly illustrating the principles of the slide type electronic device. Moreover, in the drawings, like reference numerals designate corresponding parts throughout several views.

DETAILED DESCRIPTION

Figure 1:
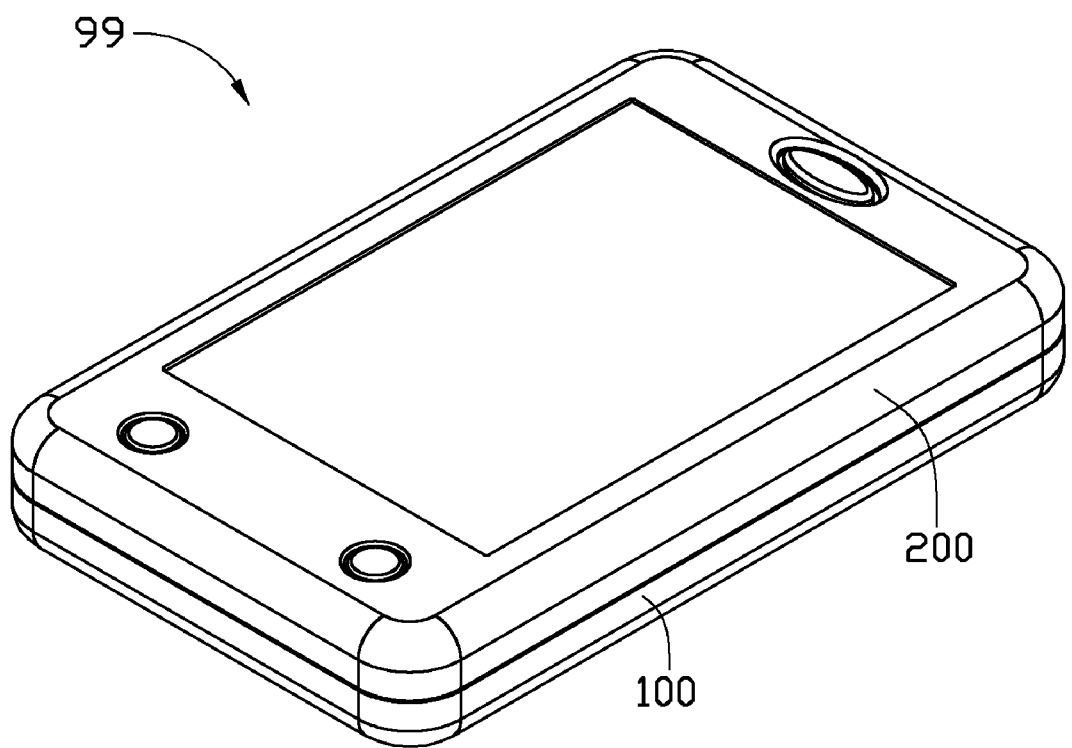
FIG. 1 is a schematic, isometric view of a slide type electronic device in accordance with an exemplary embodiment.

Referring to FIG. 1, a slide type electronic device 99 includes a base 100 and a sliding member 200 slidably connected to the base 100. The sliding member 200 slides relative to the base 100 upon application of an external force on it from a user. In the exemplary embodiment, the electronic device 99 is a cell phone.

Figure 2:
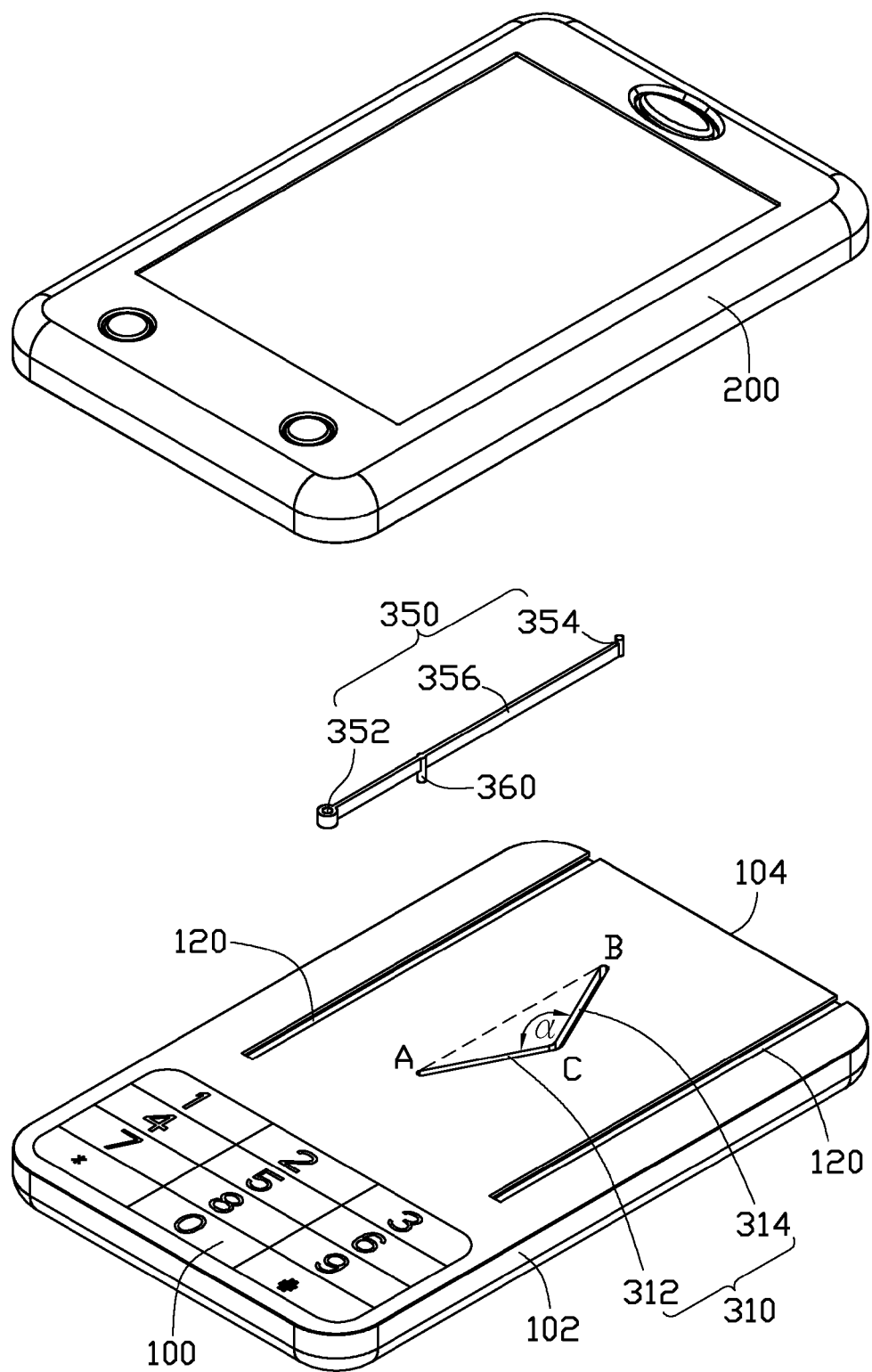
FIG. 2 is a schematic, exploded view of the electronic device of FIG. 1.

Referring to FIG. 2, the base 100 is substantially rectangular. The base 100 includes two first sidewalls 102, a second sidewall 104, two sliding grooves 120, and an angled groove 310.

The first sidewalls 102 are parallel to each other and connected to the second sidewall 104. The sliding grooves 120 are defined in an upper surface of the base 100, and parallel to each other. The sliding grooves 120 are parallel to the first sidewalls 102 and perpendicular to the second sidewall 104. Lengths of the sliding grooves 120 are shorter than lengths of the first sidewalls 102. The angled groove 310 is also defined in the upper surface of the base 100, and includes a first groove 312 and a second groove 314. There is an endpoint A at an end of the first groove 312, and an endpoint B at an end of the second groove 314. The first groove 312 and the second groove 314 form a "V" pattern, an intersection of the first groove 312 and the second groove 314 is C, and an angle α between the first groove 312 and the second groove 314 is less than 135 degrees and more than 90 degrees.

Figure 3:
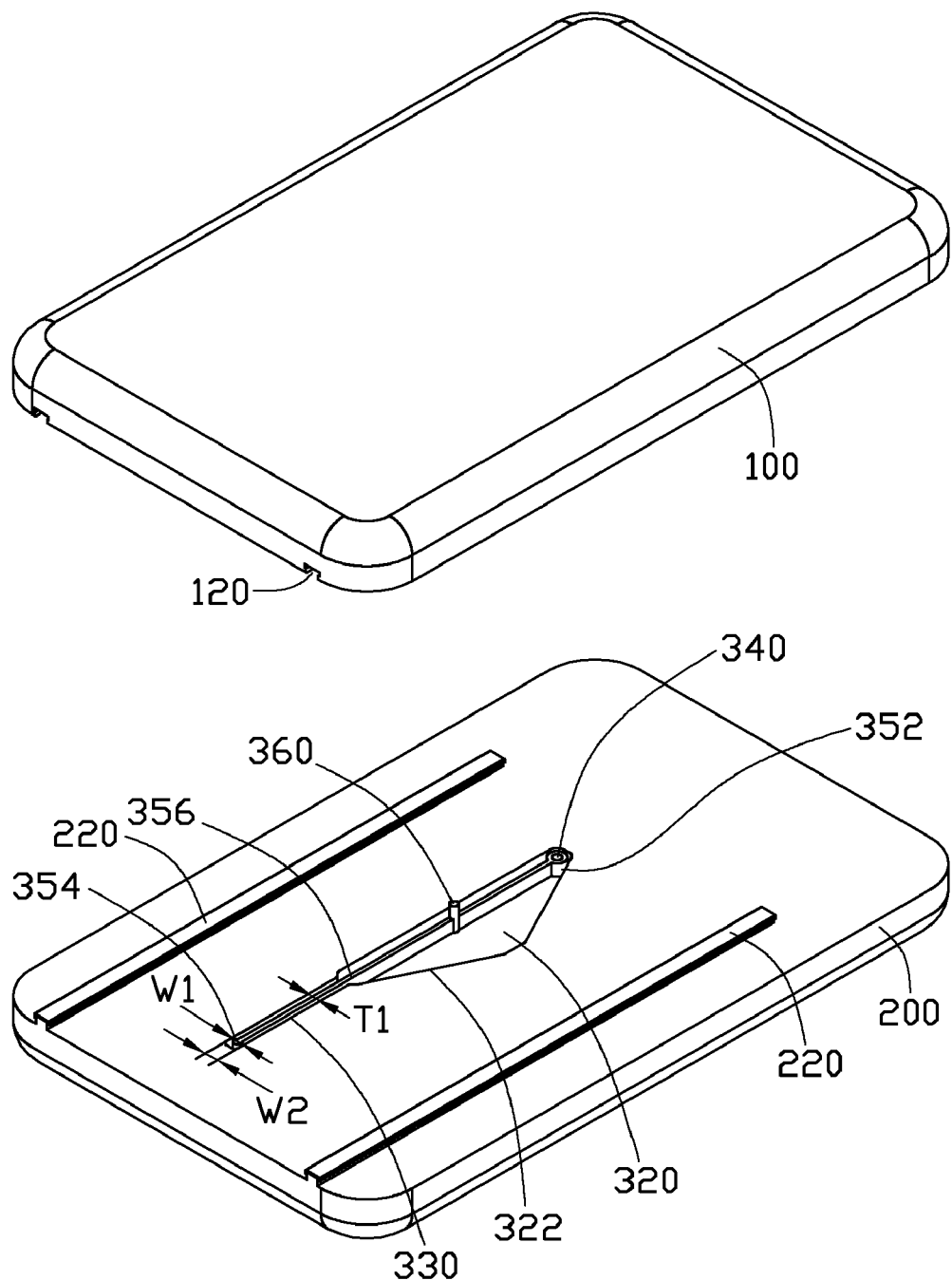
FIG. 3 is a schematic, exploded view of a sliding member of the electronic device of FIG. 1, but viewed from a reversed perspective.
Figure 4:
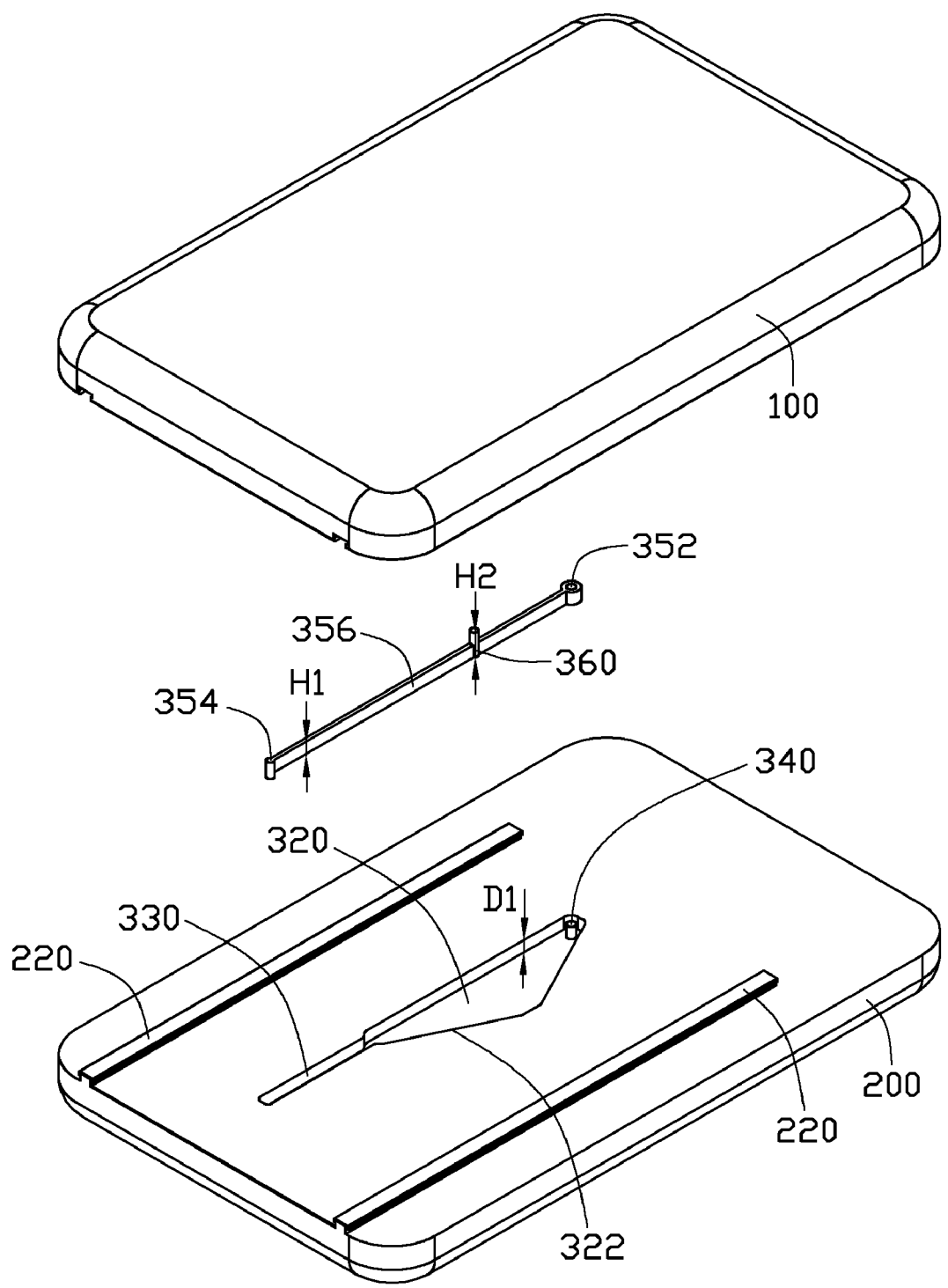
FIG. 4 is similar to FIG. 3, but further exploded.
Figure 5:
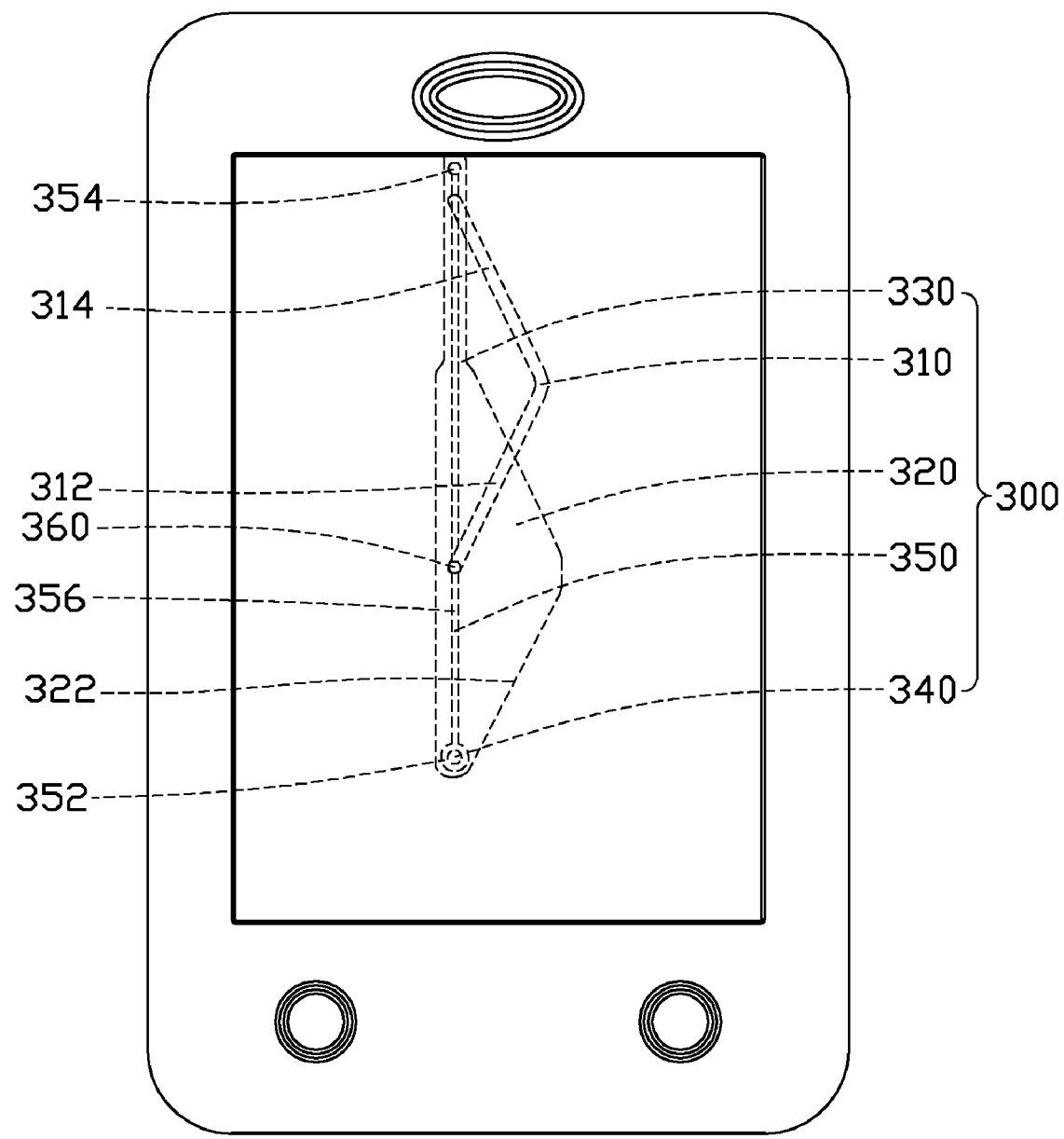
FIG. 5 is a schematic, front view of the electronic device of FIG. 1 in a close state.

Referring to FIG. 3, the sliding member 200 is also substantially rectangular, and includes two sliding rails 220 which protrude from a bottom surface of the sliding member 200. The sliding rails 220 are arranged corresponding to the sliding grooves 120. The sliding rails 220 are parallel to each other, and lengths of the sliding rails 220 are equal to or less than the lengths of the sliding grooves 120.

A cavity 320 is defined in the bottom surface of the sliding member 200. The cavity 320 includes a triangular depression 322 and an elongated groove 330 extending from a vertex of the triangular depression 322 and a positioning pin 340. The triangular depression 322 of the cavity 320 is shaped similarly to the angled groove 310. The elongated groove 330 is parallel to the sliding rails 220, and the positioning pin 340 is set at an end of the cavity 320 opposite to the elongated groove 330.

Referring to FIGS. 2-5, the slide type electronic device 99 has a release assisting mechanism 300. The release assisting mechanism 300 not only includes the angled groove 310 and the cavity 320 that are described above, but also includes a resilient member 350.

The resilient member 350 is attached to the sliding member 200, and the length of the resilient member 350 is equal to or less than the sum of a length of the elongated groove 330 and one side of the triangular depression 322 of the cavity 320 so that the resilient member 350 can be mounted in the cavity 320. The resilient member 350 is a leaf spring. The height H1 of the resilient member 350 is less than the depth D1 of the cavity 320. The first groove 312 and the second groove 314 extends away from the resilient member 350 towards the intersection C. The cavity 320 is configured to provide enough space for an elastic deformation of the resilient member 350. The resilient member 350 includes an elongated main body 356, a first end 352, a second end 354, and a protrusion 360. The first end 352 and the second end 354 are set at two ends of the elongated main body 356 respectively. The first end 352 includes a hole, so that the positioning pin 340 passes through the hole of the first end 352. The second end 354 is substantially columnar and located in the elongated groove 330. The width W1 of cross section of the second end 354 is more than the thickness T1 of the elongated main body 356, and is equal to or less than the width W2 of the elongated groove 330 of the cavity 320 (see FIG. 3).

The protrusion 360 is substantially columnar, and set on the elongated main body 356. The protrusion 360 is parallel to the positioning pin 340, and received in the angled groove 310. The height H2 of the protrusion 360 is more than the depth D1 of the cavity 320.

In assembly, firstly, the positioning pin 340 is passed through the hole of the first end 352, and the resilient member 350 is received in the cavity 320. Secondly, the sliding rails 220 are aligned with the sliding grooves 120, and then the sliding rails 220 are pushed into the sliding grooves 120 from the second sidewall 104 and the protrusion 360 is moved from the endpoint B of the second groove 314 to the endpoint A of the first groove 312, accordingly, the sliding member 200 covers the base 100, and the electronic device 99 is in the closed state (see FIG. 5).

Figure 6:
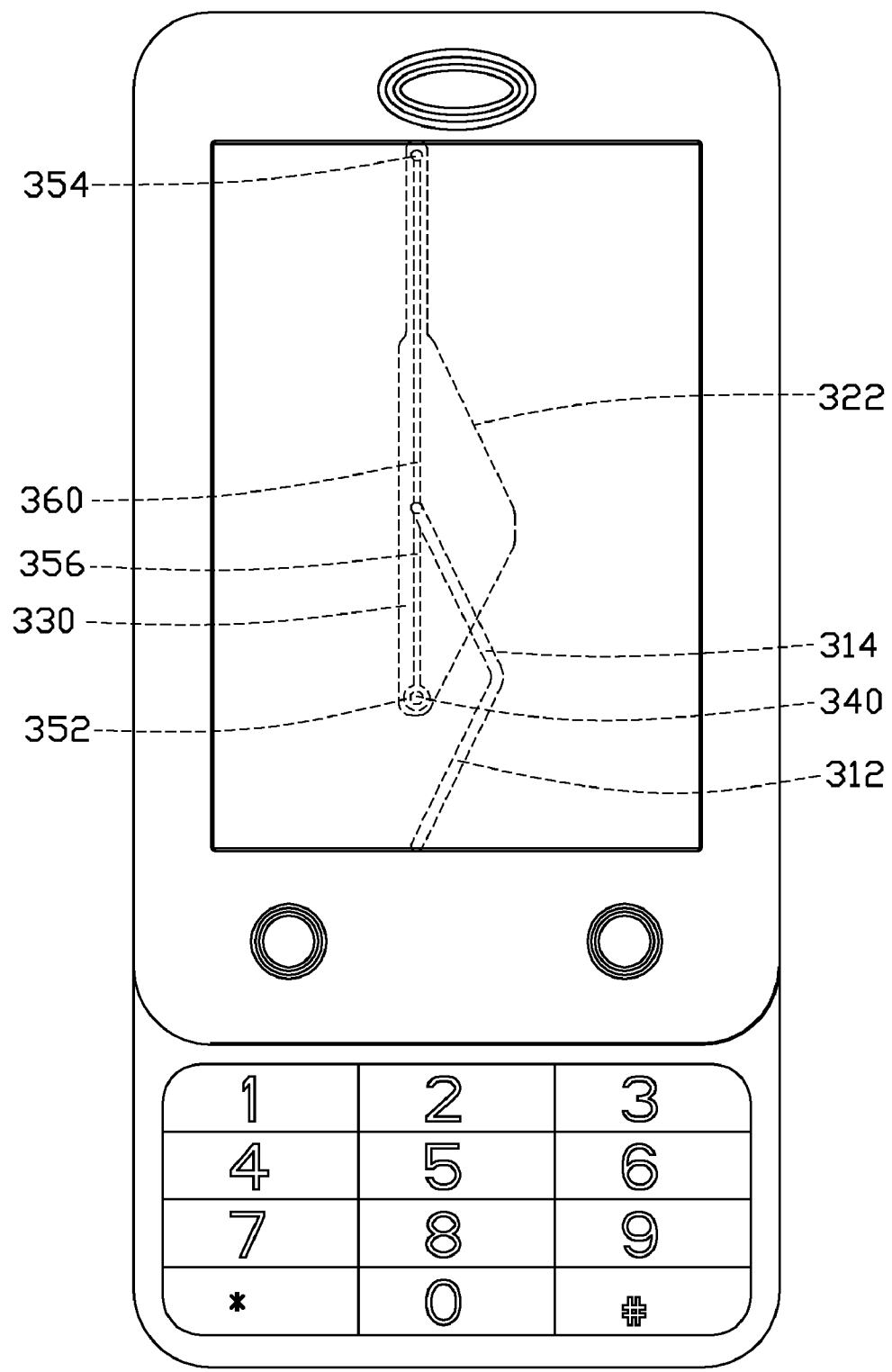
FIG. 6 is a schematic, front view of the electronic device of FIG. 1, in an open state.

When the sliding member 200 is pushed away from the base 100 along the sliding grooves 120, the sliding rails 220 are moved along the sliding grooves 120, and the protrusion 360 of the resilient member 350 is pushed by the sliding member 200 and is moved from endpoint A of the first groove 312 to the intersection C. In addition, the movement of the protrusion 360 from the endpoint A of the first groove 312 to the intersection C of the angled groove 310, causes the resilient member 350 to bend elastically. After the protrusion 360 passes the intersection C of the angled groove 310, the resilient member 350 starts to resume to its original shape due to the elastic force, and the protrusion 360 is moved in the second groove 314 and the sliding member 200 is further slid away from the base 100 due to the movement of the resilient member 350, accordingly, the electronic device 99 is in the open state (see FIG. 6).

When the sliding member 200 is pulled toward the base 100 along the sliding grooves 120, the sliding rails 220 are moved along the sliding grooves 120, and the protrusion 360 of the resilient member 350 is pulled by the sliding member 200 and is moved from the endpoint B of the second groove 314 to the intersection C of the angled groove 310. In addition, the movements of the protrusion 360 from the endpoint B of the second groove 314 to the intersection C of the angled groove 310, causes the resilient member 350 to bend elastically. After the protrusion 360 passes the intersection C of the angled groove 310, the resilient member 350 starts to resume to its original shape due to the elastic force, and the protrusion 360 is moved in the first groove 312 and the sliding member 200 is further slid to the base 100 due to the resumed movement of the resilient member 350, accordingly, the electronic device 99 is in the close state (see FIG. 5).

As described above, when the user opens or closes the slide type electronic device 99, only the protrusion 360 needs to pass the intersection C, and the electronic device 99 does the rest of opening or closing by itself.

In another embodiment, the angled groove 310 is formed in the sliding member 200, the cavity 320 is defined in the upper surface of the base 100, and the resilient member 350 is attached to the base 100.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A slide type electronic device comprising:
   a base;
   a sliding member slidably connected to the base; and
   a release assisting mechanism comprising an angled groove and a resilient member, wherein the angled groove is formed in one of the base and the sliding member, the resilient member is attached to the base or the sliding member that does not have the angled groove formed therein, the angled groove comprises a first groove and a second groove, the first groove and the second groove extend to form an angle and meet at an intersection, the resilient member comprises a protrusion received in the angled groove;
   wherein, when the sliding member slides relative to the base, the resilient member moves with the sliding member and the protrusion is guided to move along the angled groove, which causes the resilient member to bend elastically; and
   after the protrusion passes the intersection, the protrusion engages one of the first groove or the second groove, which facilitates the sliding of the sliding member via the restoration of the resilient member.

2. The slide type electronic device as described in claim 1, wherein the first groove and the second groove form a "V" pattern.

3. The slide type electronic device as described in claim 2, wherein the angle between the first groove and the second groove is less than 135 degrees and more than 90 degrees.

4. The slide type electronic device as described in claim 1, wherein the release assisting mechanism further comprises a cavity, the cavity is also formed in the base or the sliding member that does not have the angled groove formed therein, the cavity further comprises a triangular depression and an elongated groove extending from one vertex of the triangular depression, the resilient member is received in the cavity, and the cavity is configured to provide space for elastic deformation of the resilient member.

5. The slide type electronic device as described in claim 4, wherein the triangular depression of the cavity is shaped similarly to the angled groove.

6. The slide type electronic device as described in claim 4, wherein the resilient member is mounted in the cavity, and the height of the resilient member is less than the depth of the cavity.

7. The slide type electronic device as described in claim 4, wherein the resilient member further comprises an elongated main body, a first end, a second end; the first end comprises a hole, the cavity further comprises a positioning pin, and the positioning pin passes through the hole of the first end.

8. The slide type electronic device as described in claim 7, wherein the second end is substantially columnar and located in the elongated groove, the width of cross section of the second end is more than the thickness of the elongated main body, and is equal to or less than the width of the elongated groove of the cavity, and the height of the protrusion is more than the depth of the cavity.

9. The slide type electronic device as described in claim 4, wherein the length of the resilient member is equal to or less than the sum of a length of the elongated groove and one side of the triangular depression of the cavity.

10. The slide type electronic device as described in claim 9, wherein the resilient member is a leaf spring.

11. A slide type electronic device comprising:
    a base;
    a sliding member slidably connected to the base;
    a release assisting mechanism comprising an angled groove and a resilient member, wherein the angled groove is formed in one of the base and the sliding member, the resilient member is attached to the base or the sliding member that does not have the angled groove formed therein, the angled groove comprises a first groove and a second groove, the first groove and the second groove extend to form an angle and meet at an intersection, the resilient member comprises a protrusion received in the angled groove; and
    a cavity formed in the base or the sliding member that does not have the angled groove formed therein, the cavity comprising a triangular depression and an elongated groove extending from one vertex of the triangular depression, the resilient member being received in the cavity, the cavity being configured to provide space for elastic deformation of the resilient member;
    wherein, when the sliding member slides relative to the base, the resilient member moves with the sliding member and the protrusion is guided to move along the angled groove, which causes the resilient member to bend elastically; and
    after the protrusion passes the intersection, the protrusion engages one of the first groove or the second groove, which facilitates the sliding of the sliding member via the restoration of the resilient member.

12. The slide type electronic device as described in claim 11, wherein the first groove and the second groove form a "V" pattern.

13. The slide type electronic device as described in claim 12, wherein the angle between the first groove and the second groove is less than 135 degrees and more than 90 degrees.

14. The slide type electronic device as described in claim 11, wherein the triangular depression of the cavity is shaped similarly to the angled groove.

15. The slide type electronic device as described in claim 11, wherein the resilient member is mounted in the cavity, and the height of the resilient member is less than the depth of the cavity.

16. The slide type electronic device as described in claim 11, wherein the resilient member further comprises an elongated main body, a first end, a second end; the first end comprises a hole, the cavity further comprises a positioning pin, and the positioning pin passes through the hole of the first end.

17. The slide type electronic device as described in claim 16, wherein the second end is substantially columnar and located in the elongated groove, the width of cross section of the second end is more than the thickness of the elongated main body, and is equal to or less than the width of the elongated groove of the cavity, and the height of the protrusion is more than the depth of the cavity.

18. The slide type electronic device as described in claim 11, wherein the length of the resilient member is equal to or less than the sum of a length of the elongated groove and one side of the triangular depression of the cavity.

19. The slide type electronic device as described in claim 18, wherein the resilient member is a leaf spring.

* * * * *